May 13, 1930. H. G. ANDRÉ 1,758,680

RECTIFYING APPARATUS

Filed Oct. 29, 1926

Inventor
Henri G. André
by Roberts, Cushman & Woodbury
Attys.

Patented May 13, 1930

1,758,680

UNITED STATES PATENT OFFICE

HENRI G. ANDRÉ, OF PARIS, FRANCE

RECTIFYING APPARATUS

Application filed October 29, 1926. Serial No. 145,014.

The present invention relates to methods of and means for obtaining direct currents or potentials of constant value from variable sources and more particularly from a source of alternating current. Various means heretofore have been used for rectifying currents, inductances and/or condensers being employed for reducing the variations in the rectified current. While the unidirectional current obtained in this manner has been of sufficiently constant value for some purposes, there are many cases, for example radio, in which the current variations are of sufficient amplitude to be objectionable.

In double wave rectifiers arranged in series with each other as regards the load circuit, it has been customary to provide several rectifying branches operating independently of one another and each containing condensers, the charges of which combine in such manner that potential variations in the load circuit were effectively removed. The separation of branches was favorably reflected in the output by way of particularly high constancy of potential.

However, in circuits employing two rectifiers in parallel with each other as regards the load circuit, it has been proposed to connect one or more smoothing condensers in the conductor common to both rectifying circuits. The required smoothing has also been derived by the reactive characteristics of the load itself as in the case of a filter, the first section of which may contain a condenser across the line which also places the smoothing device in the common conductor. However, disadvantages attend each of these schemes for the reason that having to charge the same condenser, the branch circuits can not function independently of one another, and accordingly, voltage disturbances arising in one branch may deleteriously affect the other by applying across the rectifier a back voltage resulting therefrom. This condition is accentuated in case the condensers are of large capacity or the disturbance pronounced and also in the event of a highly resistive load that precludes rapid dissipation of the charge between impulses. Furthermore, due to the fact that both branches charge the same condenser during succeeding intervals, there can be no cancellation or offsetting of one condenser-potential pulse against another to produce a particularly steady potential in the output.

Now, I propose to invest the parallel arrangement with the same advantages by way of capacitative smoothing as pointed out with respect to the series system. In brief, this is accomplished by devising a novel circuit in which a condenser is provided for each branch and removed from the common conductor to eliminate the disadvantages above noted. In order to ensure further independency between branches I insert a choke.

The primary object of my invention is to provide a method of and means for obtaining a direct current potential of practically constant value and a translation from alternating current of such complete order as to be adapted to the various energization requirements of thermionic tubes in general, i. e. amplifiers, oscillators, X-ray and the like. Another object is to reduce current variations within the rectifying system proper without the aid of filters. A further object is to devise a system applicable to the parallel arrangement of rectifiers whereby the back voltage across each rectifier is minimized and a current derived of particularly high constancy.

The features of my invention which I consider novel are pointed out with particularity in the appended claims. The invention itself will best be understood by reference to the following description taken in connection with the accompanying drawing in which I have shown several embodiments. Throughout the views, similar reference characters indicate corresponding elements.

Figures 2, 3 and 4 show modifications wherein the several elements are interchanged and combined; while

Figure 1:
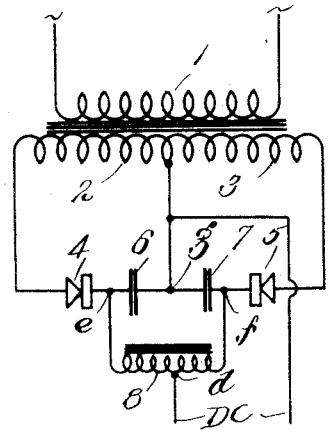
Figure 1 represents a diagrammatic embodiment of the present invention.

Referring to Fig. 1 which I consider a preferred embodiment, numeral 1 indicates a primary to which may be connected a source of alternating current of commercial frequency and voltage. Across secondary coils 2 and 3, there are connected two branched circuits having a conductor in common, one containing rectifier 4 and condenser 6, the other includes rectifier 5 and condenser 7. Choke coil 8 is connected across two points intermediate the rectifiers and condensers, a tap being taken from its midpoint to form one side of the line, hereinafter referred to as the utilization circuit. The other side of the latter is taken from the common conductor. For members 4 and 5, any suitable form of rectifier may be used, for example, mercury arc, electrolytic and thermionic tubes including the gaseous type. However, for an output of high voltage and relatively small current as in plate circuit energization, I prefer to utilize the Raytheon rectifier so-called as disclosed and claimed in an application of C. G. Smith, Serial No. 526,095 and entitled Electrical apparatus. For small voltage and relatively high amperage as in furnishing energy for filamentary cathodes of space current devices, a rectifier capable of passing a current of the order of one or two amperes is necessitated, for example, the colloid type so-called, disclosed in my application Serial No. 749,214, filed November 11, 1924, and entitled "Unilateral conductor for rectifying alternating current". While I have referred to two kinds of rectifiers, having particular adaption to a special load, it is apparent that satisfactory results may be obtained by other forms of unilateral conductors.

The operation of the two branched circuits is such that condensers 6 and 7 alternately charge through their adjacent rectifier and discharge each in the same direction to the load giving an additive result as will be explained hereinafter.

Each charge on condensers 6 and 7 may be considered as passing through the respective left and right halves of coil 8 to the common utilization circuit.

The action may be visualized as follows: Point $d$ is always at the mid-potential of points 2 and 3 for the mid-point of a symmetrical inductance is half way between its ends. Hence, however much the potentials of condensers 6 and 7 may vary, the potential between $e$ and $f$ is always the average of the two if the drop in potential due to impedance is neglected. When the value of the inductance in coil 8 is large, the load current is at all times drawn substantially equally from the two condensers. The value of inductance for this purpose need be such that its impedance to supply frequency is many times the impedance of the condensers. Thus, when energizing cathode filaments requiring one to two amperes at six volts, good results are obtainable when the value of each capacity is of the order of 1000 microfarads and each inductance has a value of 100 or 200 millihenries. It will be noted that there is passing substantially steady current in opposite directions through each half of coil 8 to the common output.

In view of the fact that both currents are practically equal, the net magnetization of the core is substantially zero giving the effect of an air magnetic path. As will be apparent, saturation and consequent inadequacy of choking is positively precluded and furthermore, the core losses are minimized enabling an enlargement of the coil for a given loss. Leakage reactance between halves of the choke is also effective in aiding the condensers to smooth the rectifier current.

Figure 5:
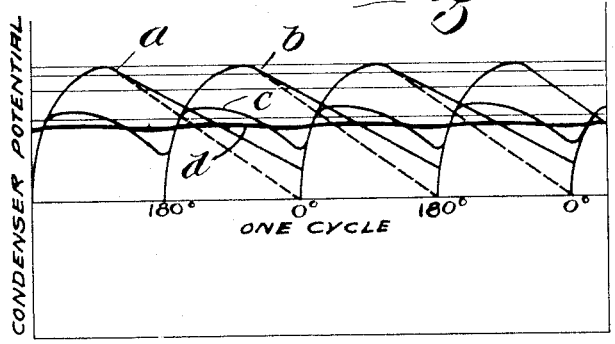
Figure 5 illustrates a curve useful in explaining the condenser action.

Referring now to Figure 5, I show by diagram the smoothing effect offered by condensers 6 and 7. Curves $a$ and $b$ represent instantaneous values of potential across each condenser as plotted against portions of the cycle. As will be noted, during the ascending portion of each curve, the rectifier operates as a conductor of negligible impedance, the condenser potential following closely that of the impressed electromotive force. However, during the descending portion, the rectifier constitutes an open circuit and the condenser discharges through load, the rate of discharge which depends in part upon the size of condenser, determining the slope of line. Generally speaking, the greater the capacity of each condenser, the nearer will be the approach of the mean potential curve C to a straight line. While for purposes of reducing back voltage applied across each rectifier, it is desirable to dissipate the entire charge between cycles at a rate suggested by the dotted slope, I prefer to utilize condensers of a larger order which discharge at such a rate, indicated roughly by full line, that a substantial amount of charge remains at the end of each cycle. The undissipated charge is useful in producing a greater smoothing effect and also increasing the net output potential. It is obvious that the arrangement provides a cancellation of much variation in the combined charge, leaving a ripple of higher frequency and small amplitude of minor consequence. Curve $d$ represents the order of voltage available after complete smoothing has been effected. Curve $c$ which approaches a straight line and represents the average potential value of the two condensers has been derived by adding the instantaneous values and dividing by two. The small inverted loop at the lowermost part of this curve suggests the added smoothing effect offered by the leakage reactance inherent in the transformer and coil 8.

In view of the fact that coil 8 is passable only to approximately steady direct current the pulsatory component is largely confined to the branch circuits. However, the latter have no element in common except an equipotential conductor and hence, operate independently of one another in so far as alternating current is concerned.

Figure 2:
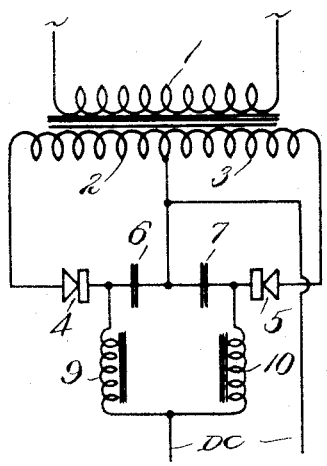

Figure 2 contemplates dividing the single coil member 8 of Figure 1 into two distinct elements 9 and 10. Inasmuch as the coils are on separate cores, the current in each do not oppose as in Figure 1 and hence may be considered as offering individual choking effects to such variations in potential as was not cancelled in the condenser arrangement. However, by utilizing separate cores having no inductive relation, the advantage of zero net magnetization as explained with respect to Figure 1 does not apply but in its stead, the coils offer considerable choking effect.

Figure 3:
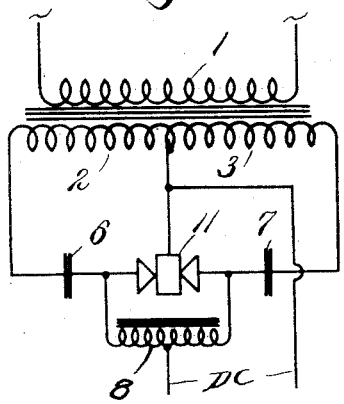

Figure 3 has been derived by interchanging the rectifier and condenser in each branch of Figure 1 and combining the two cathodes into single member 11. The circuital arrangement has particular advantage in employing a single cathode-double anode unit enclosed within a common envelope. It is obvious, however, that this modification is equally adapted to a single anode-double cathode rectifier.

Figure 4:
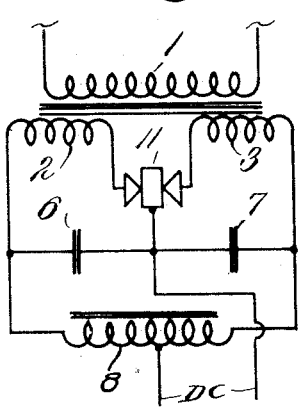

In Figure 4, the double rectifying unit has been interposed between the secondary coils of the transformer, condensers 6 and 7 being connected across each coil and rectifier in series as in Fig. 3. As will be noted, choke 8 is arranged across the two condensers in like manner to Figure 1. The operation of the last two mentioned circuits is similar to those previously described and include branch circuits electrically independent of one another.

While I have shown four circuital arrangements as illustrative of my invention, it is apparent that minor circuit changes may be made without departing from the spirit of the invention.

I claim:

1. A rectifying system comprising a transformer, the secondary circuit of which includes two pairs of elements, each pair consisting of a rectifier and a condenser, a direct current conductor joining the latter to the midpoint of the secondary, a utilization circuit, one side of which is connected to points intermediate each rectifier and condenser and the other side taken from said conductor.

2. In a rectifying system comprising an input source of alternating current, two branched circuits having a path in common and in inductive relation to said source, a rectifier and condenser in each branch, an inductance connected across the two condensers and one side of a utilization circuit taken from the midpoint of said inductance, the other side of said utilization circuit being taken from the common path.

3. In a rectifying system comprising an input source of alternating current, a plurality of circuits in inductive relation thereto, each circuit containing a group of elements including a rectifier, condenser and inductance, a terminal of each of said elements in the same group being joined together to form one side of a utilization circuit.

4. In a rectifying system comprising a source of alternating current, a plurality of circuits deriving energy therefrom, each containing a rectifier and condenser, and a coil connected from points intermediate each rectifier and condenser to form part of a utilization circuit, the net average magnetization of said coil being substantially zero whereby saturation is precluded.

5. In a rectifying system comprising a source of alternating current, a plurality of circuits deriving energy therefrom, each containing a rectifier and condenser, and a coil connected from points intermediate each rectifier and condenser to form part of a utilization circuit, the core of the coil being devoid of an air-gap yet magnetically unsaturated.

Signed by me at Boston, Massachusetts, this 17th day of September, 1926.

HENRI G. ANDRÉ.